United States Patent [19]
Gehm et al.

[11] 4,019,117
[45] Apr. 19, 1977

[54] CIRCUIT ARRANGEMENT FOR AN INVERTER

[75] Inventors: Horst Gehm, Rottenbach; Werner Gratzke, Erlangen; Wilhelm Linden, Erlangen-Buchenbach, all of Germany

[73] Assignee: Siemens Aktiengesellschaft, Munich, Germany

[22] Filed: Sept. 3, 1975

[21] Appl. No.: 610,053

[30] Foreign Application Priority Data

Sept. 9, 1974 Germany .......................... 2443025

[52] U.S. Cl. .............................................. 321/45 R
[51] Int. Cl.² ...................................... H02M 7/155
[58] Field of Search ............ 321/5, 24, 45 R, 45 C; 318/227

[56] References Cited

UNITED STATES PATENTS

| | | | |
|---|---|---|---|
| 3,340,453 | 9/1967 | Bradley et al. | 321/5 |
| 3,710,230 | 1/1973 | VeNard | 321/45 C |
| 3,887,859 | 6/1975 | Hubner | 321/45 C |

FOREIGN PATENTS OR APPLICATIONS

| | | | |
|---|---|---|---|
| 1,208,803 | 1/1966 | Germany | 321/5 |
| 1,413,516 | 2/1970 | Germany | 321/5 |

*Primary Examiner*—William H. Beha, Jr.
*Attorney, Agent, or Firm*—Kenyon & Kenyon Reilly Carr & Chapin

[57] ABSTRACT

In an inverter bridge having a recovery diode bridge associated therewith with the junction points in the inverter bridge coupled to corresponding junctions of the recovery diode bridge the d.c. inputs of the inverter are connected by means of symmetrically arranged electronic switches to the two d.c. supply voltage potentials with the recovery diode bridge connected to the d.c. supply ahead of the electronic switches. Also shown are auxiliary circuits including a capacitor, inductance and resistance associated with the electronic switches which permit elimination of the protective circuit components usually associated with the inverter semiconductors and recovery diodes.

5 Claims, 12 Drawing Figures

CIRCUIT ARRANGEMENT FOR AN INVERTER

BACKGROUND OF THE INVENTION

This invention relates to inverters in general and more particularly to an improved circuit arrangement for an inverter bridge having associated therewith a recovery diode bridge.

Inverters for coverting a d.c. voltage to an a.c. voltage using semiconductors such as thyristors in a bridge circuit are known. Furthermore, such inverters having a recovery diode bridge associated therewith with the junctions in the inverter bridge coupled to corresponding junctions in the recovery diode bridge circuit are also known. In these arrangement various protective circuits have been developed for protecting the inverter semiconductors and the recovery diodes. This, of course, increases the cost of such inverters. In view of this, the need for an improved inverter eliminating some of these circuits and providing additional capabilities becomes evident.

SUMMARY OF THE INVENTION

The present invention provides such a circuit for use with an inverter of the type described above. According to the present invention the construction of such an inverter is simplified by providing symmetrically arranged electronic switches such as transistors, thyristors or d.c. control elements between the two potentials of the d.c. supply voltage and the inverter bridge with the recovery diode bridge arranged ahead of the electronic switches between the two potentials of the d.c. supply voltage. In other words the circuit of the present invention contains a symmetrical switch arrangement located between the inverter bridge and the recovery diode bridge. This allows interrupting the supply of energy to the inverter bridge at any desired time. As a result, the means value of the current or the voltage at the load can be adjusted and the commutation of the load current from one controlled rectifier of the inverter bridge to the next controlled rectifier can be initiated in simple fashion. No chokes or capacitors are required as energy storage devices between the symmetrical switch arrangement and the inverter bridge. Currents impressed from the load side at the moment when the electronic switches are cut off are commutated to the recovery diode bridge which, in accordance with the present invention, is coupled ahead of the symmetrical switch arrangement. During the return of energy from the load circuit to the d.c. voltage source the inverter bridge is de-coupled from the d.c. voltage source. It should be noted that the d.c. voltage source may be designed as the intermediate storage portion of an intermediate link coverter. The primary advantages of the circuit of the present invention are the minimal voltage stresses placed on the controlled rectifiers in the inverter and the reduced circuitry required for commutation.

The circuit of the present invention can be adapted to many modes of operation by appropriate control of the electronic switches. For pulsed operation synchronous control of the two symmetrically arranged switches is used with both switches switched simultaneously on to conduct current or off to block current. For commutation purposes an alternating control can be used in which one of the two switches is always in a current conducting state when the other switch is in a state blocking current. Finally, it is possible to connect and disconnect the d.c. voltage on one side only.

It is to great advantage that the control of the electronic switches by synchronized with the control of the inverter rectifiers. For this purpose, a control arrangement can be provided which is coupled to the control unit for inverter. Typical inverter control units contain a pulse generator followed by a ring counter for distributing the firing pulses to the individual controlled rectifiers of the inverter bridge circuit. Thus, the switching command for the electronic switches will preferably be derived from the pulses of this pulse generator.

In one illustrated embodiment of the invention the current rate of rise and the voltage rate of rise are limited by means associated with the electronic switches at their load paths. This illustrated embodiment is based on the insight that in a series circuit made up of an electronic switch and a controlled rectifier, such as a thyristor, which are brought into the current conducting state simultaneously, a limitation of the current rate of rise and voltage rate of rise at the load path of the electronic switch will also cause a limitation of the current rate of rise in the controlled rectifier and also particularly control the potential at the terminal of the rectifier which faces away from the electronic switch. Through suitable choice of the devices for limiting the current rate of rise and limiting the voltage rate of rise associated with the electronic switches, protective circuit components normally associated with the inverter rectifier along with protective circuitry associated with the recovery diodes can be eliminated. This results in a considerable simplification of the overall inverter circuit.

As is well known, in an inverter bridge employing thyristors as a controlled rectifiers, the thyristors are extinguished by letting the current become zero. The reliability of the extinguishing process is increased by a counter voltage which is applied for a brief time. In one illustrated embodiment of the present invention this is achieved by associating with each electronic switch an auxiliary circuit comprising a choke connected in series with the load path of the switch and a series circuit consisting of a capacitor and resistor shunted across the choke. These same circuits, through appropriate design, can also be used as limiting devices for the current rate of rise and voltage rate of rise. To accomplish this the resistance of the resistor in the auxiliary circuit is determined by the ratio of the maximum permissible voltage rate of rise to maximum permissible current rate of rise in the controlled rectifier of the inverter or the recovery diodes. The inductance of the choke and the auxiliary circuit should correspond approximately to the ratio of the maximum operating voltage at the capacitor in the auxiliary circuit to maximum permissible current rate of rise of the controlled rectifiers of the inverter or the recovery diodes. The design of these components follows from the values for maximum permissible current rate of rise and maximum permissible voltage rate of rise of the controlled inverter rectifiers or recovery diodes, depending on which of these have the lower voltage and current rating. The advantage of this particular embodiment of the present invention is particularly apparent in a three-phase inverter bridge circuit. In such an arrangement separate protective circuitry is usually provided for each inverter rectifier and for each recovery diode. In other words, a total of 12 such protective circuits are normally required. However, in the circuit of the present invention only the auxiliary circuits for the two electronic switches at the d.c. voltage inputs of the inverter need be provided.

DETAILED DESCRIPTION OF THE PREFERRED EMBODIMENT

Figure 1:
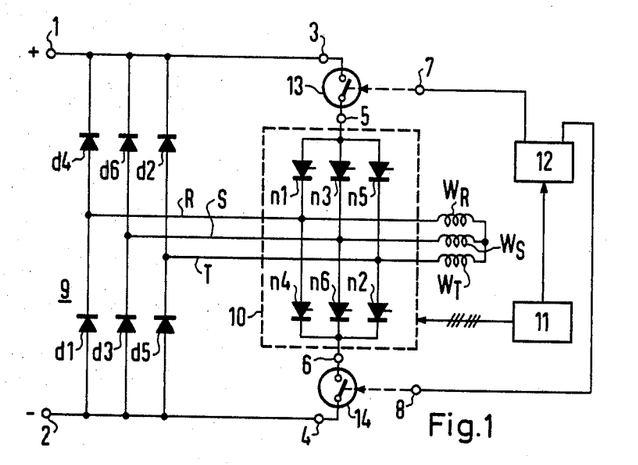
FIG. 1 is a schematic diagram of an inverter according to the present invention.

FIG. 1 is a circuit diagram illustrating the basic embodiment of the present invention. Shown is an inverter 10 having controlled rectifiers n1 to n6 in a bridge circuit providing an a.c. output, for example, to a load transformer or an electric machine having windings WR, WS and WT connected to the phases R, S and T of the inverter. In accordance with the present invention, the positive d.c. terminal 1 and negative d.c. terminal 2 are coupled to the inverter bridge 10 through switches 13 and 14 respectively. Switch 13 has an input terminal 3 coupled to the terminal 1 of the d.c. source and an output terminal 5 which is the input terminal to the positive side of the bridge. Similarly, the terminal 4 of switch 14 is coupled to the negative terminal 2 and its output 6 is the negative input terminal to bridge 10. Switch 13 has a control input 7 and switch 14 a corresponding control input 8. These control inputs are fed from a control means 12 which obtains its input from the control unit 11 providing firing pulses to the inverter rectifiers. Also coupled across the d.c. input is a recovery diode bride 9 made up of the diodes d1 throuh d6. In accordance with the present invention, it is coupled to the d.c. source ahead of the switches 13 and 14. The junction points between pairs of diodes are coupled to corresponding junction points between the controlled rectifiers in the bridge 10. In other words, they are coupled to the phases R, S and T.

To further explain the basic operation of the circuit of FIG. 1 the events occurring during a commutation process will now be described. Assume that the load current flowing during one phase flows from the positive potential of the d.c. supply voltage through the electronic switch 13 which is turned on, the inverter rectifier n3 the inverter rectifier n2 and the electronic switch 14, which is also turned on, to the negative potential of the d.c. supply voltage. To initiate commutation from the inverter rectifier n2 to the inverter rectifier n4, the electronic switch 14 is cut off. With switch 14 off, when the potential of the phase T has risen above the potential of the d.c. supply voltge by an amount equal to the threshhold voltage of the recovery diode d2 due to the current impressed from the load side, the recovery diode d2 becomes conductive and the rectifier n2, which up to that point had carried current, will now have no current and passes into a blocked state. When the current in the inverter rectifier n2 ceases, the electronic switch 14 can be closed to conduct again at the end of its recovery time. Thereafter the inverter rectifier n4 can be fired and will take over the load current.

The circuit of FIG. 1 also permits pulsed operation of the inverter 10. In such operation the inverter rectifier n2 is maintained in a current conducting state by means of a continuous pulse. The electronic switch is turned on and off to connect and disconnect the d.c. supply voltage as required depending on the output current or the output voltage.

Figure 2A:
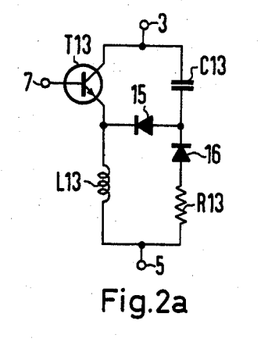
FIGS. 2a and 2b are circuit diagrams illustrating auxiliary circuits which can be used with electronic switches in the form of transistors.
Figure 2B:
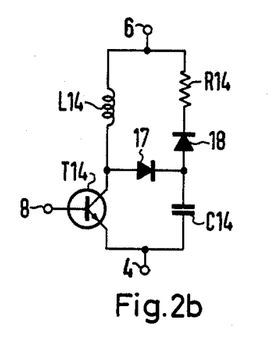

FIGS. 2a and 2b illustrate circuits which can be used for the electronic switches 13 and 14 of FIG. 1. FIG. 2a illustrates the switch 13 and FIG. 2b the switch 14. Since their operation is essentially the same, only the operation of the switch of FIG. 2a will be explained in detail. In series with the emitter collector path, i.e., the load path of the transistor T13 is a choke L13. In parallel with that circuit across the series circuit made up of the load path of the transistor T13 and choke 13 is a series circuit comprising a capacitor C13, resistor R13 and a diode 16 therebetween. An additional diode 15 is placed between the junction of capacitors C13 and diode 16 and the emitter of transistor T13. The circuit of FIG. 2b similarly includes a choke L14 in series with the load path of a transistor T14 with a series circuit comprising capacitor C14, diode 18 and resistor R14 in parallel therewith, with a diode 17 coupling the collector of transistor T14 and the junction between the capacitor C14 and diode 18.

In operation, with transisor T13 in the cut off state, capacitor C13 is charged. As soon as the transsitor T13 is switched into a current conducting state by an appropriate signal at its control electrode 7, i.e., its base, the voltage across its load path, i.e., across its emitter and collector, collapses. The difference voltage between the voltages at terminals 3 and 5 drops briefly across the choke L13 and causes a rise of current in the transistor T13 which is limited by the difference voltage and the inductance of the choke L13. During the current conducting state of the transistor T13 the capacitor C13 is discharged through the resistor R13 and diodes 16. If the transistor is then switched into a cut off state, a small voltage increase causing diode 15 to go into the conducting state is first generated by the decrease of current in the load path of the transistor. The current flowing through the load path of the transistor T13 and the choke L13 is commutated from the transistor T13 and flows as a displacement current through the capacitor C15 and the diode 15 and choke L13 as the load current of the transistor T13 goes to zero. As soon as the voltage at the terminal 5 becomes higher than the voltage at the junction of the diode 16 and capacitor C13, the diode 16 becomes conductive so that the remaining magnetic energy is dissipated through the resistor R13 and diodes 15 and 16. Operation of the circuit of FIG. 2b for transistor T14 is essentially the same.

Figure 3:
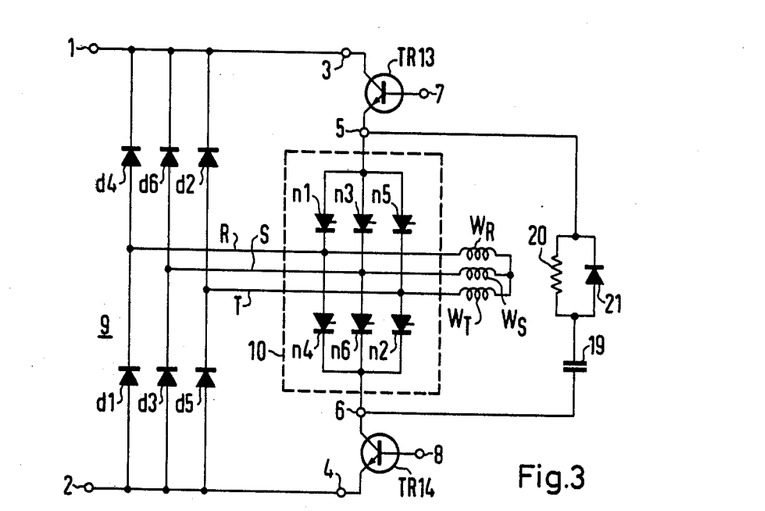
FIG. 3 is a further embodiment of the present invention illustrating a common auxiliary circuit for both electronic switches.

FIG. 3 illustrates a six pulse inverter circuit utilizing transistors TR13 and TR14 as electronic switches with a common auxiliary circuit provided for both transistors. The auxiliary circuit is coupled between the terminals 5 and 6 and the inverter 10 and includes a series circuit comprising a capacitor 19 and a resistor 20 shunted by a diode 21. With this circuit the commutation times depend on the load current. The circuit is open-circuit proof as well as being short-circuit proof. To further explain the operation of this circuit a commutation process will be described. The load current flows through the transistor TR13, the thyristor $n3$, the windings WS and WT, the thyristor $n2$ and the transistor TR14. During this time the auxiliary circuit is being made ready to act as an extinguishing aid for the two transistors TR13 and TR14. The capacitor 19 of the auxiliary circuit is being charged through the resistor 20. Commutation is initiated by turning off the transistor T14. The load current is briefly commutated to the capacitor 19 and diode 21 of the auxiliary circuit so that the transistor TR14 can be interrupted without any current flowing therethrough. The capacitor 19 is discharged in the process. When the capacitor 19 is discharged and the potential of the phase T had risen above the potential of the d.c. supply voltage by an amount equal to the threshold voltage of the recovery diode $d2$, that diode becomes conductive. The current in the thyristor $n2$, which up to that point had been conducting ceases, and the thyristor is cut off. Once cut off of the current in the thyristor $n2$ occurs, transistor TR14 can be turned back on to again conduct at the end of its recovery time. At the same thyristor $n4$ can be fired to take over the load current. Once again the auxiliary circuit is then made ready as an extinguishing aid for the transistors through the charging of the capacitor 19. Since the capacitor 19 is discharged by means of the load current, its discharge time increases linearly as the current decreases. In this discharge time the thyristors remain conductive. Accordingly, the cut off time of the transistors depends on the recovery time of the thyristors.

Figure 4:
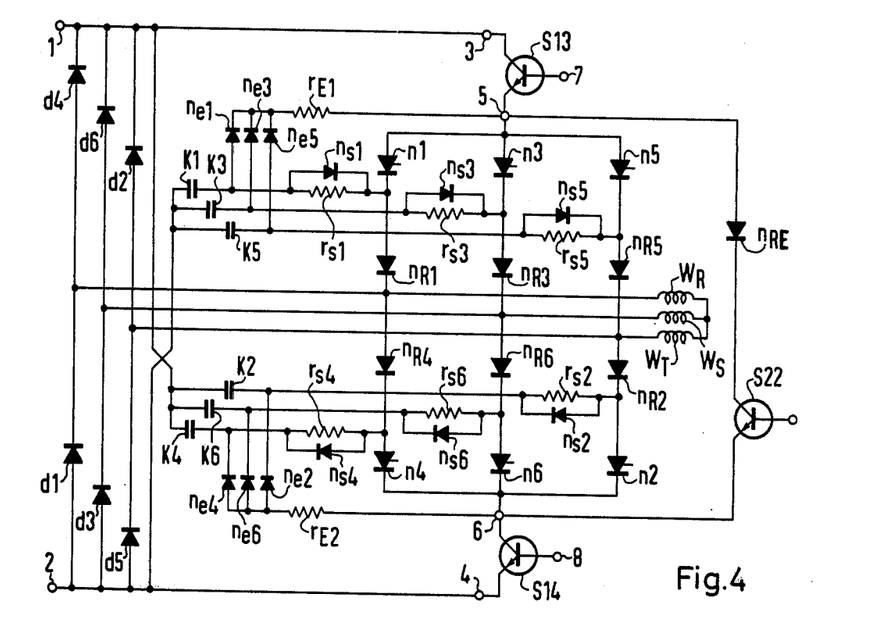
FIG. 4 is a circuit diagram of an additional embodiment of the present invention.

FIG. 4 illustrates an embodiment of the present invention which permits pulsing and commutating the load current without regard to the load condition at the output of the inverter. Associated with each thyristor $n1$ through $n6$ of the inverter bridge circuit and connected in series therewith is a diode $n_{R1}$ to $n_{R6}$. Associated with each of the transistors switches S13 and S14 acting as the electronic switches is an auxiliary circuit. In each case this auxiliary circuit is coupled between a junction of a thyristor and a diode in the inverter bridge branch and the inverse of the d.c. supply potential. Thus, for example associated with the thyristor $n4$ and its diode $n_{R4}$ is a series circuit comprising a capacitor K4 in series with a resistor $r_{S4}$ having a diode $n_{s4}$ shunted across it. The other terminal of the capacitor is coupled to the positive terminal 1. Six of these circuits are provided made up respectively of the capacitors K1 through K6, resistors $r_{S1}$ through $r_{S6}$ and diodes $n_{s1}$ through $n_{s6}$. In each case the junction point between the resistor and capacitor is coupled through an additional diode, for example $n_{E4}$, to one terminal of a resistor having its other terminal coupled to the inverter input terminal. Thus, there are shown diodes $n_{E1}$ through $n_{E6}$ coupling the respective junctions points to resistors $r_{E1}$ and $r_{E2}$. Resistor $r_{E1}$ is coupled to terminal 5 and $r_{E2}$ to terminal 6. In addition, the terminals 5 and 6 have thereacross a transistor S22 and diode $n_{RE}$.

Once again, operation of this circuit will be explained by describing the commutation process. The load current flows through the transistor S13, the thyristor $n1$, series connected diode $n_{R1}$, the windings WR and WS, the diode $n_{R6}$, thyristor $n6$ and the transistor S14. During this time the capacitors K1 and K6, which are used as extinguishing aids for the transistors S13 and S14 respectively, are charged through resistors $r_{S1}$ and $r_{s6}$. The commutation process is initiated by cutting off the transistor S13. The current which is impressed inductively from the load side is immediately commutated from the thyristor $n6$ to an auxiliary path consisting of the diode $n_{S6}$ and capacitor K6. As a result the thyristor $n6$ can immediately go into a cut off state. The load current continues to flow along the described path until capacitor K6 is discharged. After a suitable time which can be readily determined after the end of the conduction period of the thryristor $n6$, the transistor S22 only needs to be switched into conduction once at the end of the current conduction period or prior to the time of switching on the opposite thyristor of the same phase. Once the capacitor K6 is completely discharged the load current is commutated to the recovery diode $d6$. For pulsed operation of the inverter, the transistor S14 can now be switched on and a thyristor $n6$ fired. Capacitor K6 will again be charged for use in extinguishing the transistor S14. The commutation from the thyristor $n6$ and thyristor $n2$ can also be accomplished after the transistor S22 is triggered.

Figure 5:
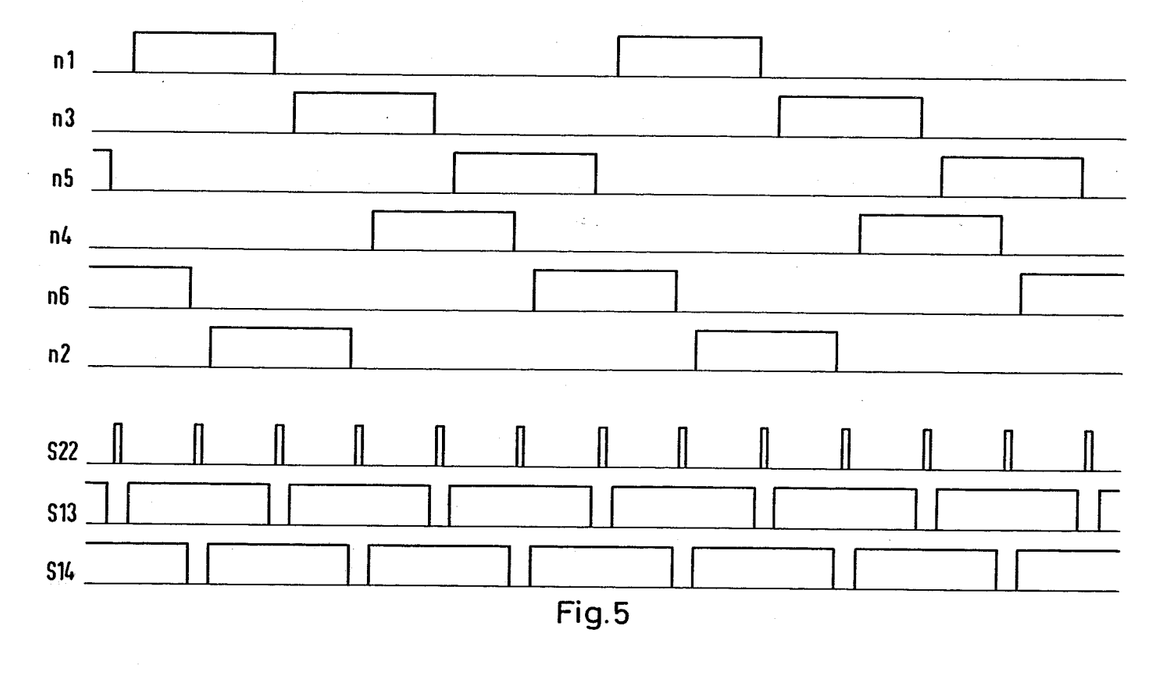
FIG. 5 is a pulse-timing diagram of the circuit of FIG. 4.

If the two transistors S13 and S14 are switched into the cut off state simultaneously the load current is first commutated to the auxiliary circuits and then to the recovery diodes. For example, the load current can flow first through the capacitor K1, the diode $n_{S1}$, the diode $n_{R1}$, the windings WR and WS, the diode $n_{R6}$, the diode $n_{S6}$, and capacitor K6. As soon as the capacitors K1 and K6 are discharged the current is commutaated to the recovery diode $d6$. FIG. 5 is pulse timing diagram for the pulses of the thyristors $n1$ to $n6$, the transistor S22 and the transistors S13 and S14 for operation with the current conduction angle of 120°. From this diagram the types of control pulses necessary for control will be evident to those skilled in the art.

Figure 6:
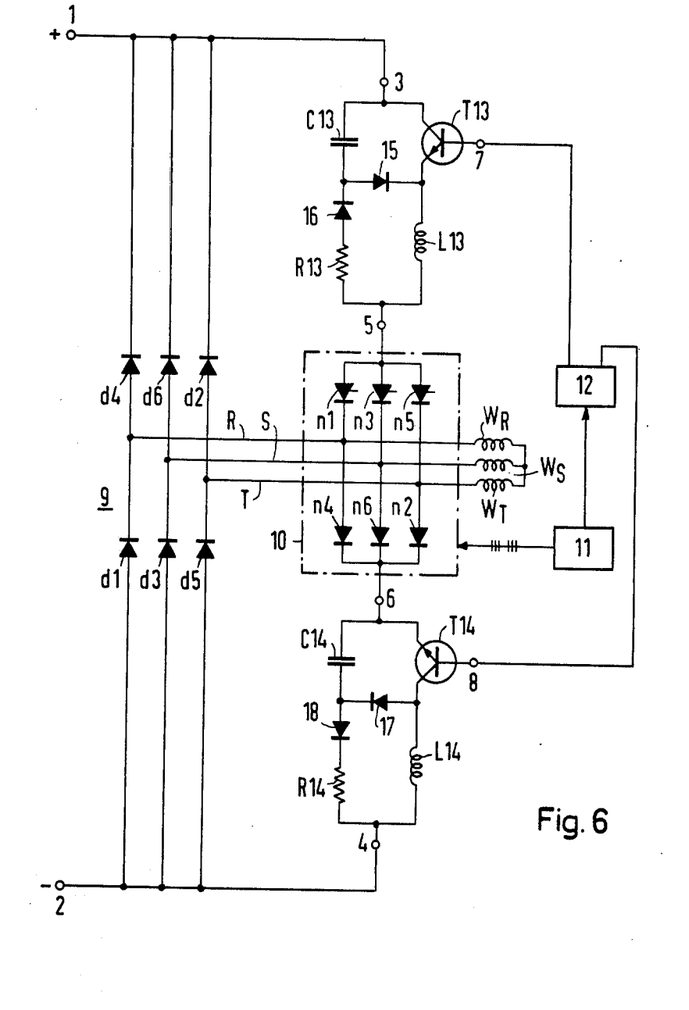
FIG. 6 illustrates a further embodiment of the present invention.

FIG. 6 is a circuit diagram essentially repeating FIG. 1 with the circuits of FIGS. 2a and 2b substituted for the schematically shown electronic 13 and 14.

As described above, limitation of current rate of rise and voltage rate of rise across the load paths of the electronic switches, i.e., between terminals 3 and 5 and 4 and 6, respectively, at the same time results in a limitation of the current rate of rise in the inverter semiconductors which have been switched into conduction and in the conducting recovery diodes. Furthermore, a limitation of the voltage rate of rise at the inverter rectifiers which are switched into the cut off condition and at the cut off recovery diodes is limited. Through suitable design of resistors R14 and R13 in the auxiliary circuit for the transistors T14 and T13, the current rate of rise and voltage rate of rise for the inverter rectifiers and recovery diodes can be limited such that no protective circuits are required for these components. In the simplest case such protective circuits comprise a series circuit including a capacitor and resistor placed across the rectifier to be protected. However, more extensive and expensive protective circuitry has also been used.

A limitation of the rate of the rise of current and between the terminals 3 and 5 when the transistors T13 is conducting also limits the rate of rise of the current in simultaneously conducting inverting rectifier $n1$, $n3$ or $n5$. The limitation of voltage rate of rise between the terminals 3 and 5 also results in a potential control at the phases R, S and T respectively when the converter rectifier n1, n3 or n5 leading from the switch to the respective phase is fired or when the corresponding recovery diode d4, d6 or d2 becomes conductive. With the control the potential at the phases R. S and T the voltage rate of rise of voltage at the cut-off inverter rectifier n4, n6 or n2 and the recovery diodes d1, d3 or d5 is also limited so that a reverse voltage breakdown cannot occur at these cut-off rectifiers.

In similar fashion, current rate of rise and voltage rate of rise between the terminals 4 and 6 results in a limitation of current rate of rise in the inverter rectifiers n4, n6 or n2 which conduct at the same time as transistor T14 and a limitation of the voltage rate of rise for the inverter rectifier n1, n3 or n5, or the recovery diodes d4, d6 or d2 which are cut-off.

When the auxiliary circuits associated with transistors T13 and T14 are to be used for limiting current rate of rise and voltage rate of rise at the inverter rectifier and recovery diodes, the resistors R13 and R14 are chosen so that their resistance corresponds approximately to the ratio of the maximum voltage rate of rise to the maximum permissible current rate of rise of the controlled rectifiers n1 through n6 or the recovery diodes d1 through d6, whichever of the two groups have the lower permissible values. Similarly, the choke L13 and L14 are selected to have inductances corresponding approximately to the ratio of the maximum voltage at the capacitor C13 or C14 to the maximum permissible voltage rate of rise, for the controlled rectifiers of the inverter or the recovery diodes.

Figure 7:
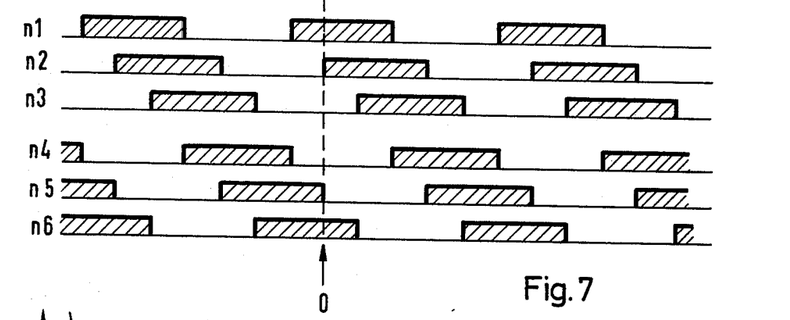
FIG. 7 is a diagram illustrating the current conducting and current blocking state of the inverter rectifiers in the circuit of FIG. 6.

FIG. 7 is a pulse diagram illustrating current conduction and current cut off times for the controlled rectifiers n1 through n6 in the inverter. Consider the point in time designated 0 on the figure. Prior to this time the rectifiers n1, n5 and n6 had been conducting. The electronic switch T13 was in the cut-off state and the electronic switch T14 in the conducting state. At the point zero the inverter rectifier n5 is extinguished the inverter rectifier n1 is again fired and the inverter rectifier n2 fired for the first time. Recovery current flows through the recovery diodes d1 and d6 during the commutation process when the inverter rectifiers n1 and n5 are extinguished. At this point, there is a danger of a reverse voltage breakdown in the inverter rectifers n3, n4, and n5 which are cut off at the time under consideration. Similarly, the recovery diodes which are cut off are also in danger. With reference to the waveforms 8a through 8d showing the corresponding voltage and currents with time scale greatly expanded over that of FIG. 7, the manner in which such reverse breakdown is avoided will be explained.

Figure 8A:
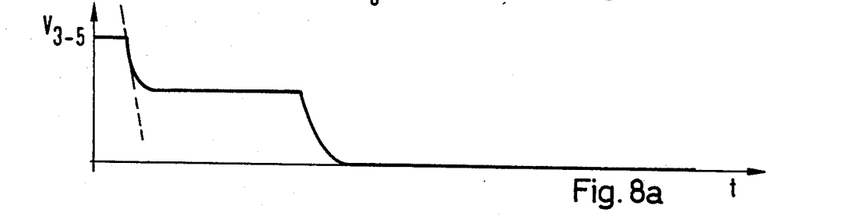
FIGS. 8a–8d are diagrams of important voltage and current waveforms occurring during the commutation process in the circuit of FIG. 4.
Figure 8B:
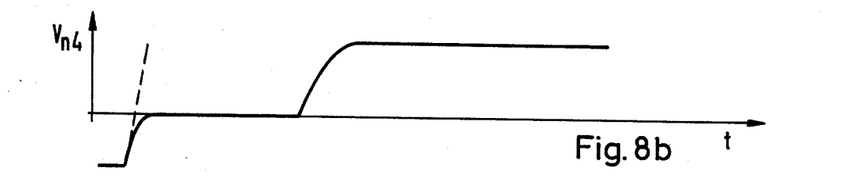
Figure 8C:
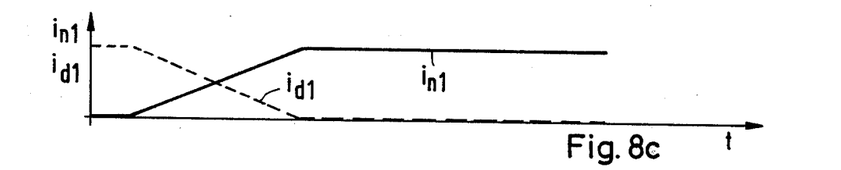

If transistor T13 is turned on and the inverter rectifier n1 fired at the same time, the voltage change $V_{3-5}$ between terminals 3 and 5 which is shown on FIG. 8a also determines the potential change at the phase R. Thus, it also determines the potential change between the phase R and the terminal 6 or between the phase R and terminal 4 since the transistor T14 is conducting at that time and the voltage difference between terminals 4 and 6 negligably small. FIG. 8b shows the rate of change of voltage $V_{n4}$ across the inverter rectifier n4. This maximum rate of change is illustrated by the dotted line has been limited to the rate of change of the voltage $V_{3-5}$ between the terminals 3 and 5. Since the current rate of rise between the terminals 3 and 5 is also limited, the rate rise of current $i_{n1}$ in the inverter rectifier n1 and thus, also the rate of change of the current $i_{d1}$ commutated off in the recovery diode d1 is limited as shown by FIG. 8c.

Figure 8D:
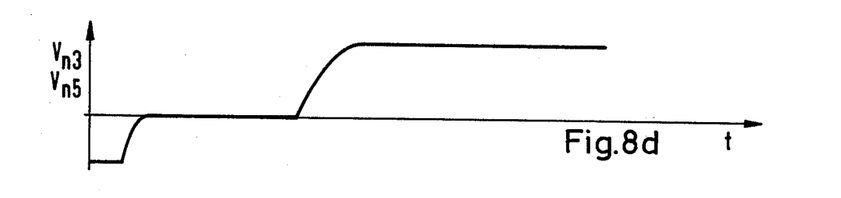

As illustrated by the waveform of FIG. 8d the voltage $V_{n3}$ and $V_{n5}$ across the cut-off inverter rectifiers n3 and n5 which are also sujbect to the danger of reverse voltage breakdown correspond to the waveform of the voltage $V_{n4}$ across the inverter n4. The limitation of the voltage rate of rise at the endangered inverter rectifiers n4, n3 and n5 prevents reverse voltage breakdown. Thus, with the arrangement of the present invention additional protective circuitry need not be provided.

Thus, an improved circuit arrangement for an inverter has been shown. Although specific embodiments have been illustrated and described, it will be obvious to those skilled in the ar that various modifications may be made without departing from the spirit of the invention which is intended to be limited solely by the appended claims.

We claim:
1. In an inverter having controlled rectifiers in a bridge circuit with recovery diodes also in a bridge circuit with the junction points of the recovery diode bridge circuit coupled to the corresponding junction points of the inverter bridge circuit, both the inverter bridge circuit and diode bridge circuit being coupled across positive and negative d.c. voltage inputs, an improved circuit arrangement comprising:
   a. symmetrically arranged electronic switches coupling the positive and negative d.c. voltage inputs to the inverter bridge circuit;
   b. an auxiliary circuit having an inductance coupled in series with the load path of each electronic switch and a series circuit comprising a capacitor, a resistor and a diode coupled in parallel across the series circuit made up of said inductance and said load path, for limiting the current rate of rise and voltage rise across said load paths; and
   c. wherein the diode recovery bridge is coupled across the d.c. input terminals ahead of the electronic switches.

2. Apparatus according to claim 1 and further including an additional diode coupled between the junction between said electronic switch and said inductance and the junction between said capacitor and said diode.

3. In an inverter having controlled rectifiers in a bridge circuit with recovery diodes also in a bridge circuit with the junction points of the recovery diode bridge circuit coupled to the corresponding junction points of the inverter bridge circuit, both the inverter bridge circuit and diode bridge circuit being coupled across positive and negative d.c. voltage points, an improved circuit arrangement comprising:
   a. symmetrically arranged electronic switches coupling the positive and negative d.c. voltage inputs to the inverter bridge circuit;
   b. an auxiliary circuit having an inductance coupled in series with the load path of each electronic switch and a series circuit comprising a capacitor and a resistor coupled in parallel across the series circuit made up of said inductance and said load path for limiting the current rate of rise and voltage rate of rise across their load paths, the resistance of said resistor being proportional to the ratio of the maximum permissible voltage rate of rise of the maximum permissible current rate of rise of the one of said controlled rectifiers in said converter bridge and said recovery diodes having the lower rated value and the inductance of said coil being proportional to the ratio of the maximum operating voltage at said capacitor to the maximum permissible current rate of rise of the one of the controlled rectifiers of the inverter bridge circuit and the recovery diodes having a lower rated value; and c. wherein the diode recovery bridge is coupled across the d.c. input terminals ahead of the electronic switches.

4. In an inverter having controlled rectifiers in a bridge circuit with recovery diodes also in a bridge circuit with the junction points of the recovery diode bridge circuit coupled to the corresponding junction points of the inverter bridge circuit, both the inverter bridge circuit and diode bridge circuit being coupled across positive and negative d.c. voltage inputs, an improved circuit arrangement comprising:
 a. symmetrically arranged electronic switches coupling the positive and negative d.c. voltage inputs to the inverter bridge circuit; and
 b. a common auxiliary circuit associated with said electronic switches said circuit including a series circuit made up of a capacitor and a resistor shunted by a diode coupled between the d.c. voltage inputs of said inverter bridge circuit; and
 c. wherein the diode recovery bridge is coupled across the d.c. input terminals ahead of the electronic switches.

5. In an inverter having controlled rectifiers in a bridge circuit with recovery diodes also in a bridge circuit with the junction points of the recovery diode bridge circuit coupled to the corresponding junction points of the inverter bridge circuit, both the inverter bridge circuit and diode bridge circuit being coupled across positive and negative d.c. voltage inputs, an improved circuit arrangement comprising:
 a. symmetrically arranged switches coupling the positive and negative d.c. voltage inputs to the inverter bridge circuit;
 b. the diode recovery bridge coupled across the d.c. input terminals ahead of the electronic switches;
 c. a first set of diodes, one in series with each of the controlled rectifiers of said inverter bridge;
 d. a plurality of series circuits, one associated with each controlled rectifier of said inverter bridge, each including a capacitor in series with a resistor with the series circuit coupled between the junction of its associated controlled rectifier and one of said first set of diodes and the d.c. voltage input terminal of opposite polarity;
 e. a second set of diodes, one of said diodes in parallel across each one of said resistors;
 f. a third set of diods equal in number to the controlled rectifiers in said bridge, each having one end coupled to the junction between a capacitor and resistor in a corresponding series circuit with the other ends of the diodes associated with the positive side of said bridge coupled through a first resistor to the positive input terminal of said bridge and the diodes associated with the negative side of the bridge coupled through a second resistor to the negative input terminal of said bridge; and
 g. a series circuit comprising a controlled electronic switch and a diode coupled across the d.c. voltage input terminals of said bridge.

* * * * *